(12) United States Patent
Kolar et al.

(10) Patent No.: US 10,562,672 B2
(45) Date of Patent: Feb. 18, 2020

(54) SOUND DAMPENING BLENDING CONTAINER

(71) Applicant: Vita-Mix Management Corporation, Olmsted Township, OH (US)

(72) Inventors: David J. Kolar, Stow, OH (US); Jack W. Gee, II, Willoughby, OH (US); Fred H. Mehlman, Brunswick, OH (US)

(73) Assignee: Vita-Mix Management Corporation, Olmsted Township, OH (US)

( * ) Notice: Subject to any disclaimer, the term of this patent is extended or adjusted under 35 U.S.C. 154(b) by 0 days.

(21) Appl. No.: 14/816,549

(22) Filed: Aug. 3, 2015

(65) Prior Publication Data

US 2016/0035335 A1 Feb. 4, 2016

Related U.S. Application Data

(60) Provisional application No. 62/032,104, filed on Aug. 1, 2014.

(51) Int. Cl.
  *B65D 25/20* (2006.01)
  *A47J 43/046* (2006.01)

(52) U.S. Cl.
  CPC ........... *B65D 25/20* (2013.01); *A47J 43/046* (2013.01)

(58) Field of Classification Search
  CPC ..... B65D 25/20; A47J 43/036; A47J 43/0727; G10K 11/16
  USPC ........................................................ 366/314
  See application file for complete search history.

(56) References Cited

U.S. PATENT DOCUMENTS

| 3,417,972 | A | | 12/1968 | Vincent | |
|---|---|---|---|---|---|
| 4,883,144 | A | * | 11/1989 | Haushalter | H02K 5/24 181/198 |
| 4,892,413 | A | * | 1/1990 | Vats | A47J 43/0716 181/200 |
| 5,432,306 | A | * | 7/1995 | Pfordresher | H02K 5/24 181/198 |
| 5,589,119 | A | | 12/1996 | Hetherington | |
| 5,965,851 | A | * | 10/1999 | Herreman | A47L 15/4209 181/200 |
| 7,481,296 | B2 | * | 1/2009 | Eilers | A47J 42/38 181/200 |

(Continued)

FOREIGN PATENT DOCUMENTS

| EP | 0498261 A2 * | 8/1992 | ............ G10K 11/16 |
|---|---|---|---|
| WO | 2007061967 A2 | 5/2007 | |

OTHER PUBLICATIONS

Young, Lee, International Search Report and Written Opinion, PCT/US2015/020769, dated Jun. 17, 2015, ISA/US, Alexandria, Virginia.

*Primary Examiner* — Marc C Howell
(74) *Attorney, Agent, or Firm* — McDonald Hopkins LLC

(57) ABSTRACT

A blending system includes a blending container having a base surface. The container also has a side wall extending upwardly from said base surface and a sound sleeve extending upwardly from said base surface and encasing the side wall. The container may also have a viscoelastic material positioned between the side wall and the sound sleeve extending upwardly from said base surface. In one embodiment, a blender has a base containing a motor and the container described above and the container is able to attach and engage with the motor and the base.

12 Claims, 9 Drawing Sheets

(56) References Cited

U.S. PATENT DOCUMENTS

| | | | |
|---|---|---|---|
| 2004/0177763 A1* | 9/2004 | Robillard, III | A47J 42/26 99/286 |
| 2006/0176765 A1 | 8/2006 | Pryor, Jr. et al. | |
| 2011/0046786 A1 | 2/2011 | Wulf et al. | |
| 2013/0153572 A1 | 1/2013 | Gillette et al. | |

* cited by examiner

SOUND DAMPENING BLENDING CONTAINER

CROSS-REFERENCE TO RELATED APPLICATION

This application claims the benefit of U.S. Provisional Patent Application Ser. No. 62/032,104, filed Aug. 1, 2014, and entitled "SOUND DAMPENING BLENDING CONTAINER," the entirety of which is incorporated herein by reference.

TECHNICAL FIELD

The present invention relates to a blending container and more particularly, to a sound dampening blending container having a sound sleeve.

BACKGROUND

Blending devices, such as blenders and blending systems, are often used to blend and process foodstuffs. In order to blend certain foodstuffs blending devices need to have a defined amount of power. This power can result in the blending system being noisy during operation. The amount of noise generated by these devices is a result of both the blending taking place within the container of the blender, often involving the crushing of ice or other hard foodstuffs, as well as the noise vibrations that are generated by the electric motor of the blender. The noise levels generated by the food processor are particularly troublesome in commercial settings such as restaurants, food stands, and coffee shops, especially where the food processor is positioned near a customer service counter.

Some of the noise that occurs during operation of the blending systems escapes through the container during operation of the blending system. It would, therefore, be beneficial for the blending container be configured to reduce the noise that occurs during operation of the blending systems. Therefore, the need exists for an improved blending container.

SUMMARY

The following presents a simplified summary of the specification to provide a basic understanding of some aspects of the specification. This summary is not an extensive overview of the specification. It is intended to neither identify key or critical elements of the specification nor delineate any scope particular to any embodiments of the specification, or any scope of the claims. Its sole purpose is to present some concepts of the specification in a simplified form as a prelude to the more detailed description that is presented later.

A blending system is provided, having various innovative features.

In one embodiment, a container for a blender has a base surface. The container has a side wall extending upwardly from said base surface and a sound sleeve extending upwardly from said base surface and circumscribing at least a portion of the side wall. The container may also have a viscoelastic material positioned between the side wall and the sound sleeve extending upwardly from said base surface.

In one embodiment, a blender has a base containing a motor and the container described above, wherein the container is able to attach and engage with the motor and the base.

In one embodiment, a sound dampening apparatus for use on a blender container includes a viscoelastic material configured to circumscribes at least a portion of the blender container and a sound sleeve configured to circumscribe at least a portion of the viscoelastic material. The sound dampening apparatus can reduce the radiated noise of the blender.

The following description and the drawings set forth certain illustrative aspects of the specification. The drawings indicated a few of various embodiments that may utilize certain aspects of this disclosure. While some improvements and novel aspects may be specifically identified, others will be apparent from the detailed description.

DETAILED DESCRIPTION

Figure 1:
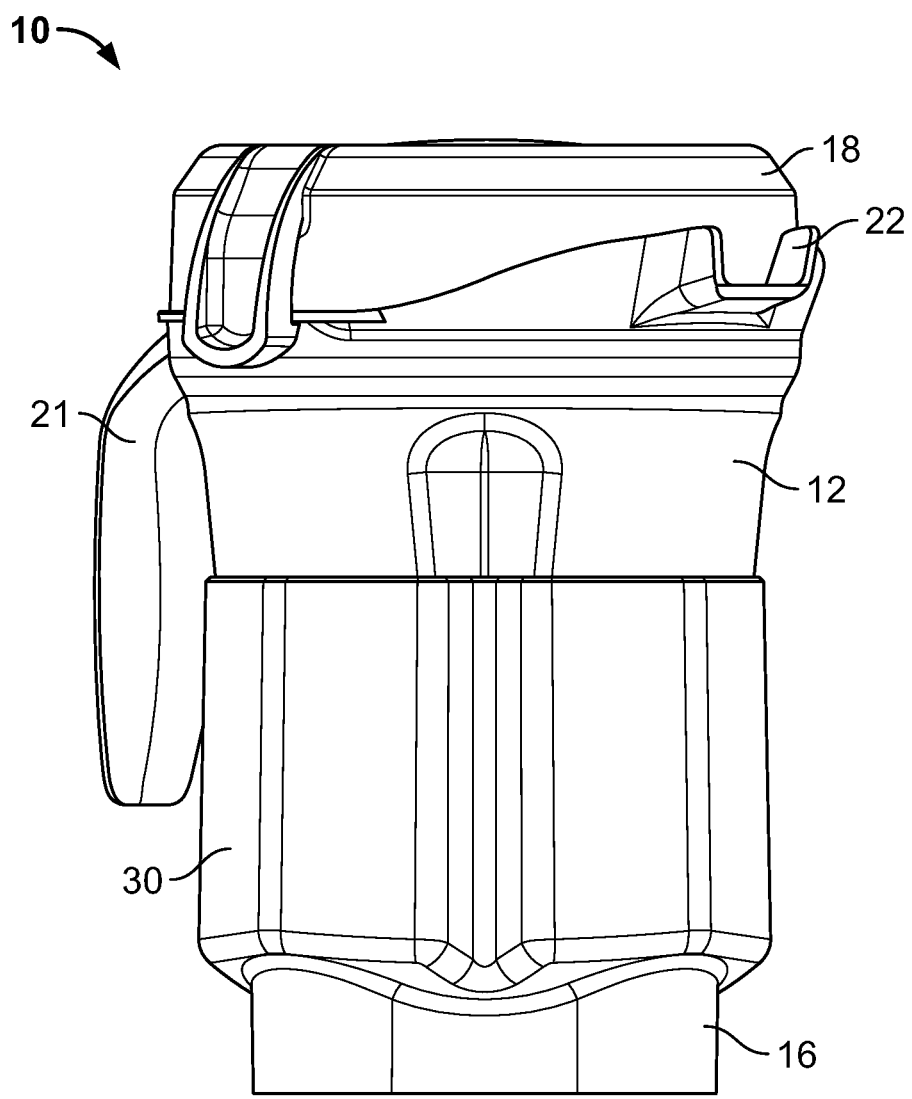
FIG. 1 is a side view of a blending container with a sound sleeve.
Figure 2:
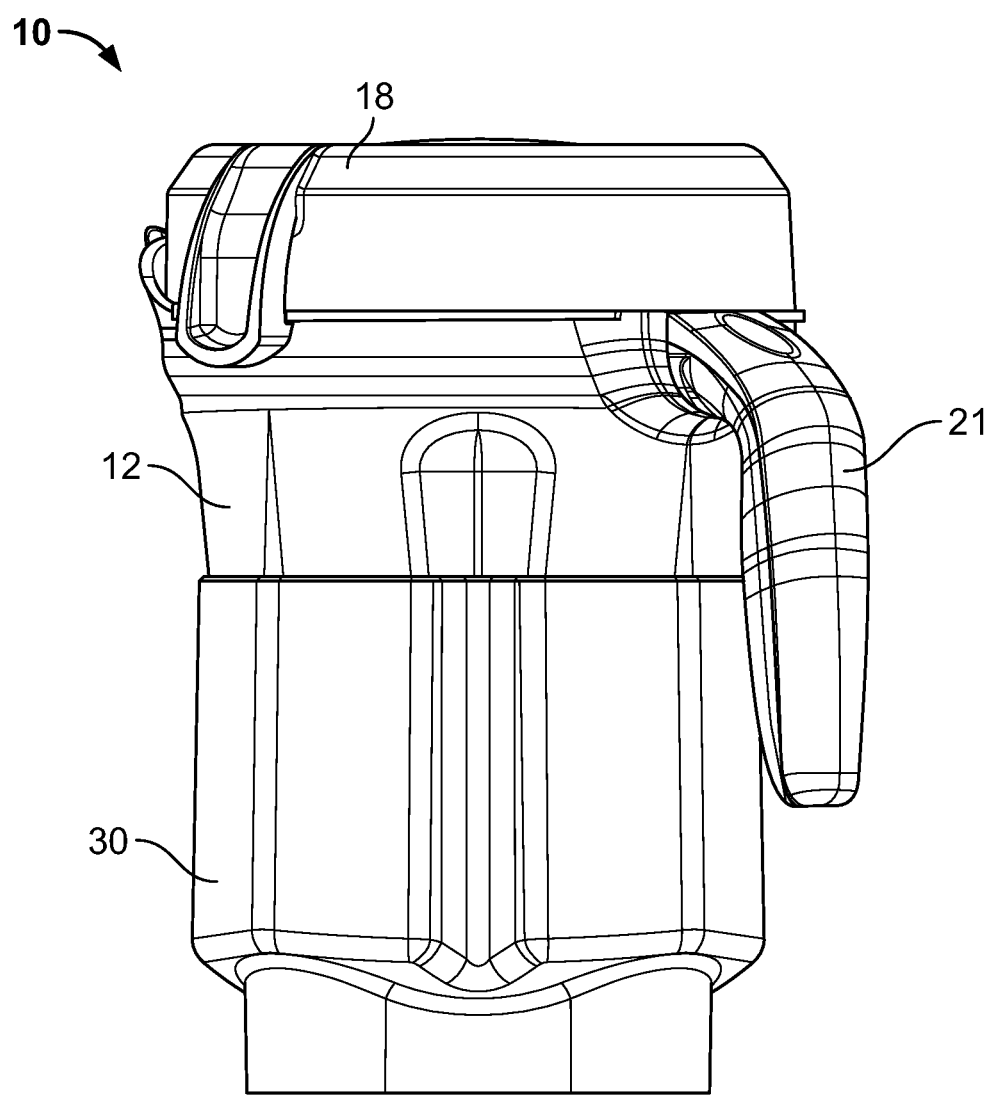
FIG. 2 is a side view of the blending container with a sound sleeve.
Figure 3:
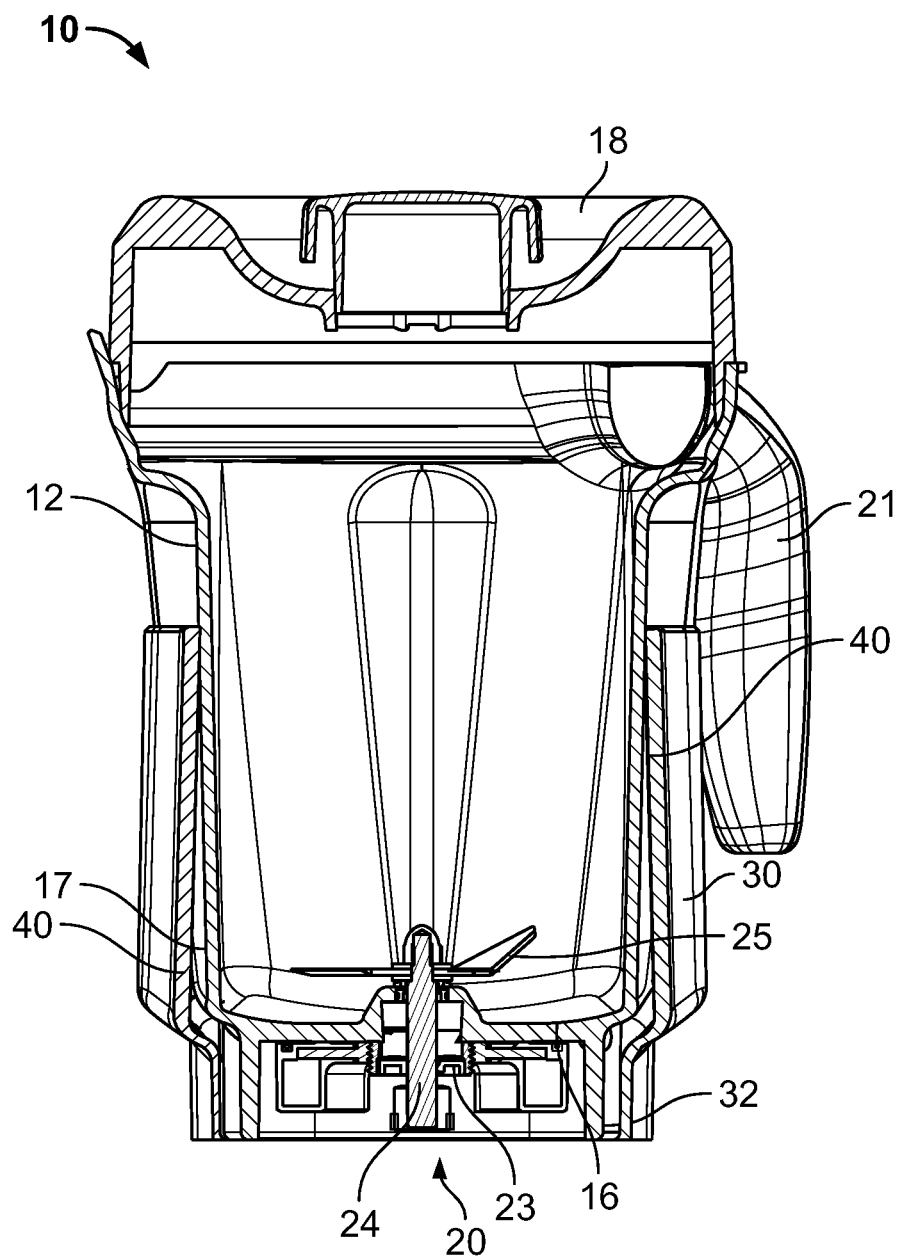
FIG. 3 is a cross-sectional view of the blending container with the sound sleeve.
Figure 4:
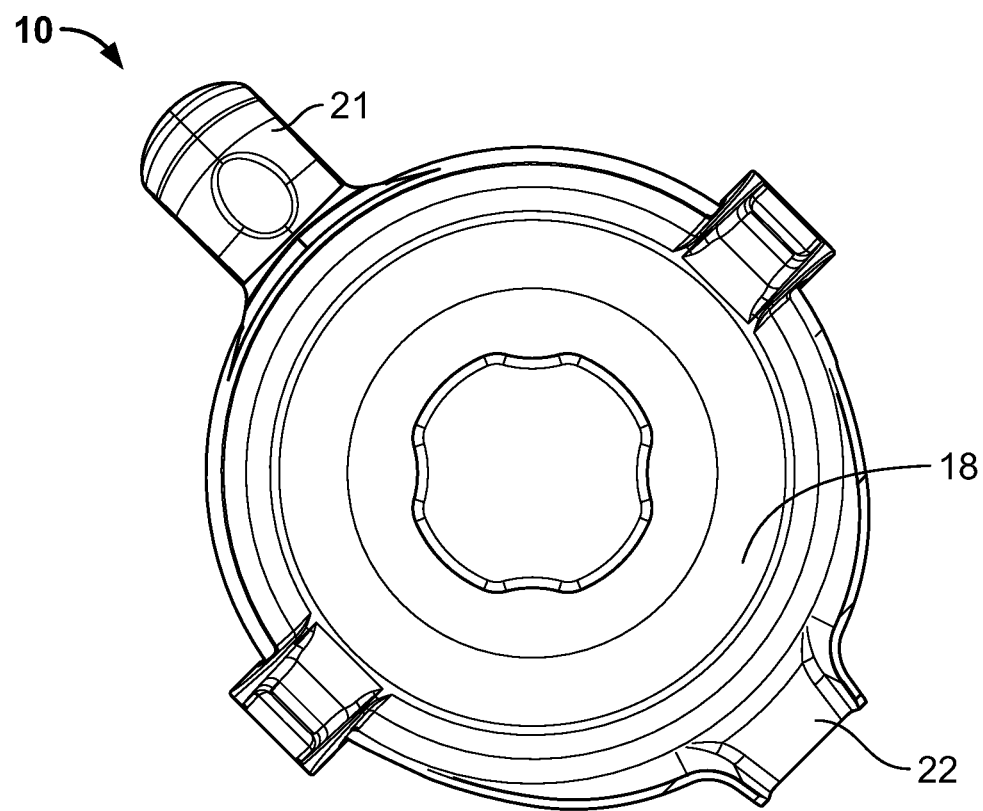
FIG. 4 is a top view of the blending container with sound sleeve with a lid.
Figure 5:
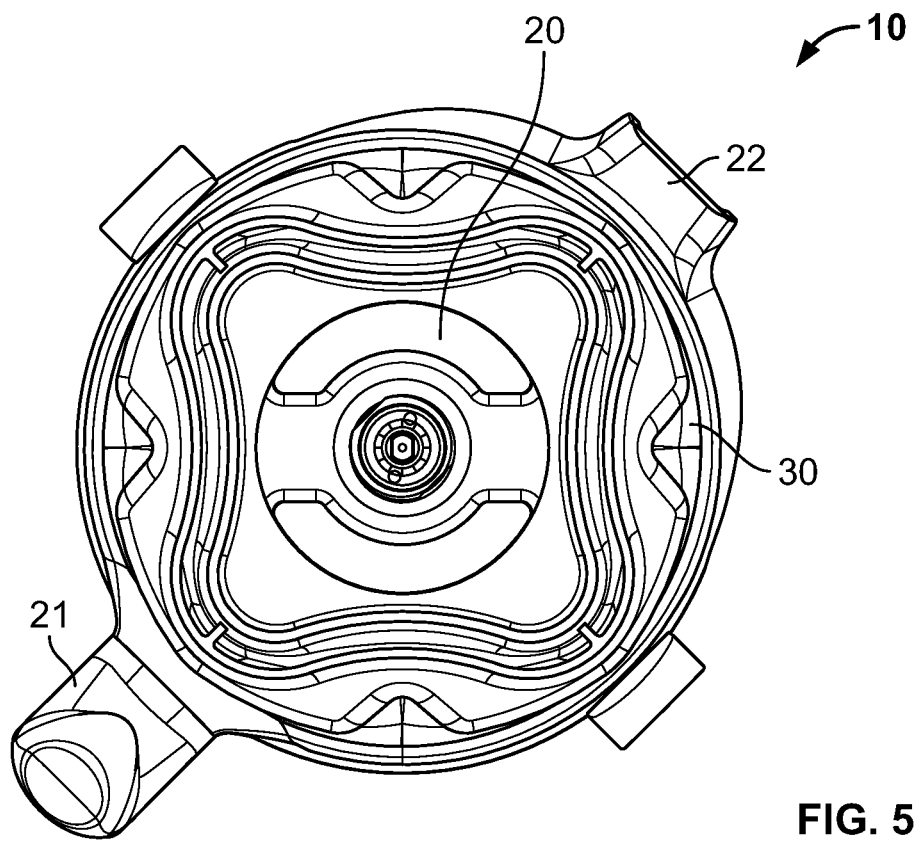
FIG. 5 is a top cross sectional view of the blending container with the sound sleeve.
Figure 6:
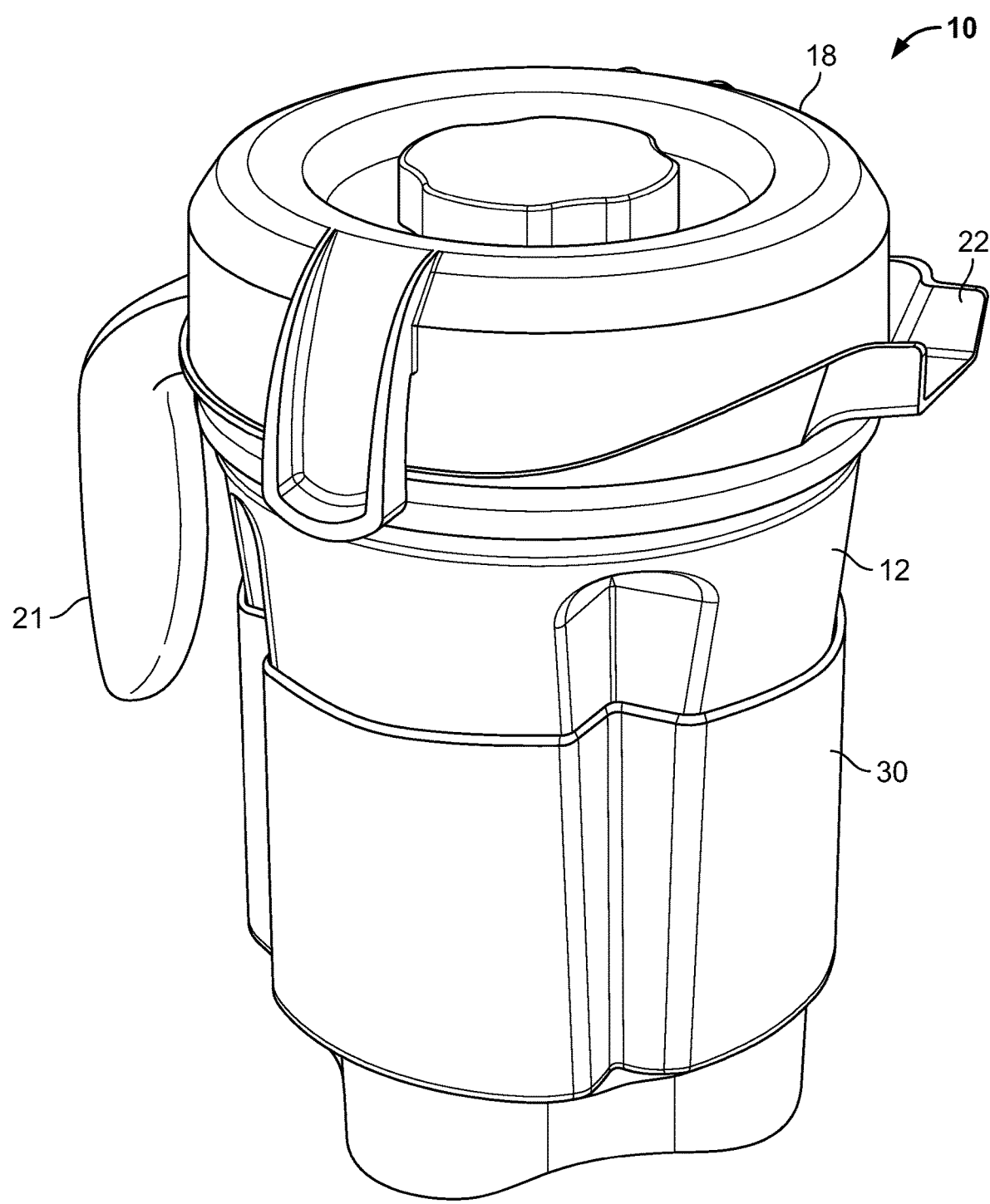
FIG. 6 is a perspective view of a blending container with a sound sleeve.
Figure 7:
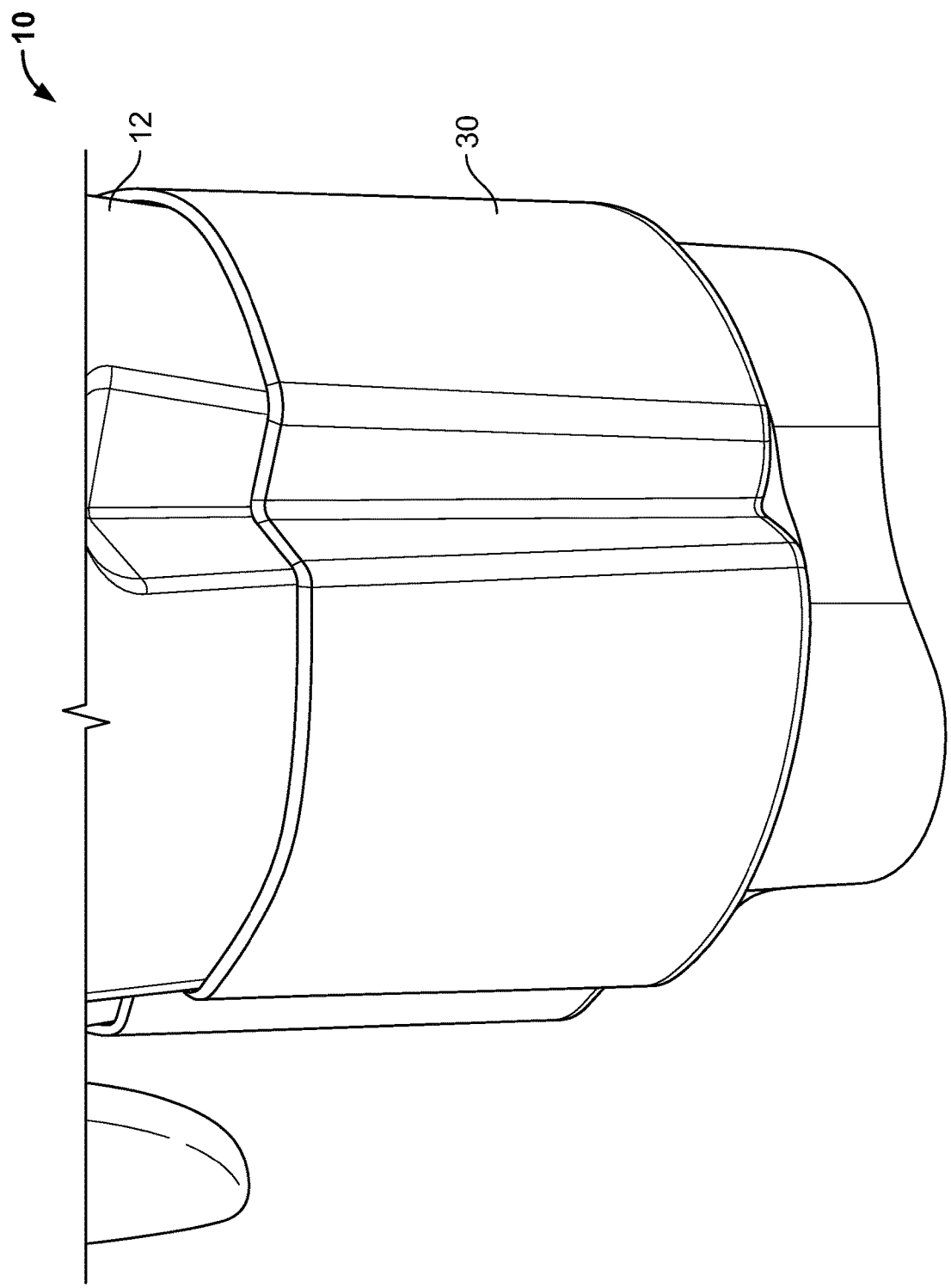
FIG. 7 is a close up perspective view of a portion of the blending container with the sound sleeve.
Figure 8:
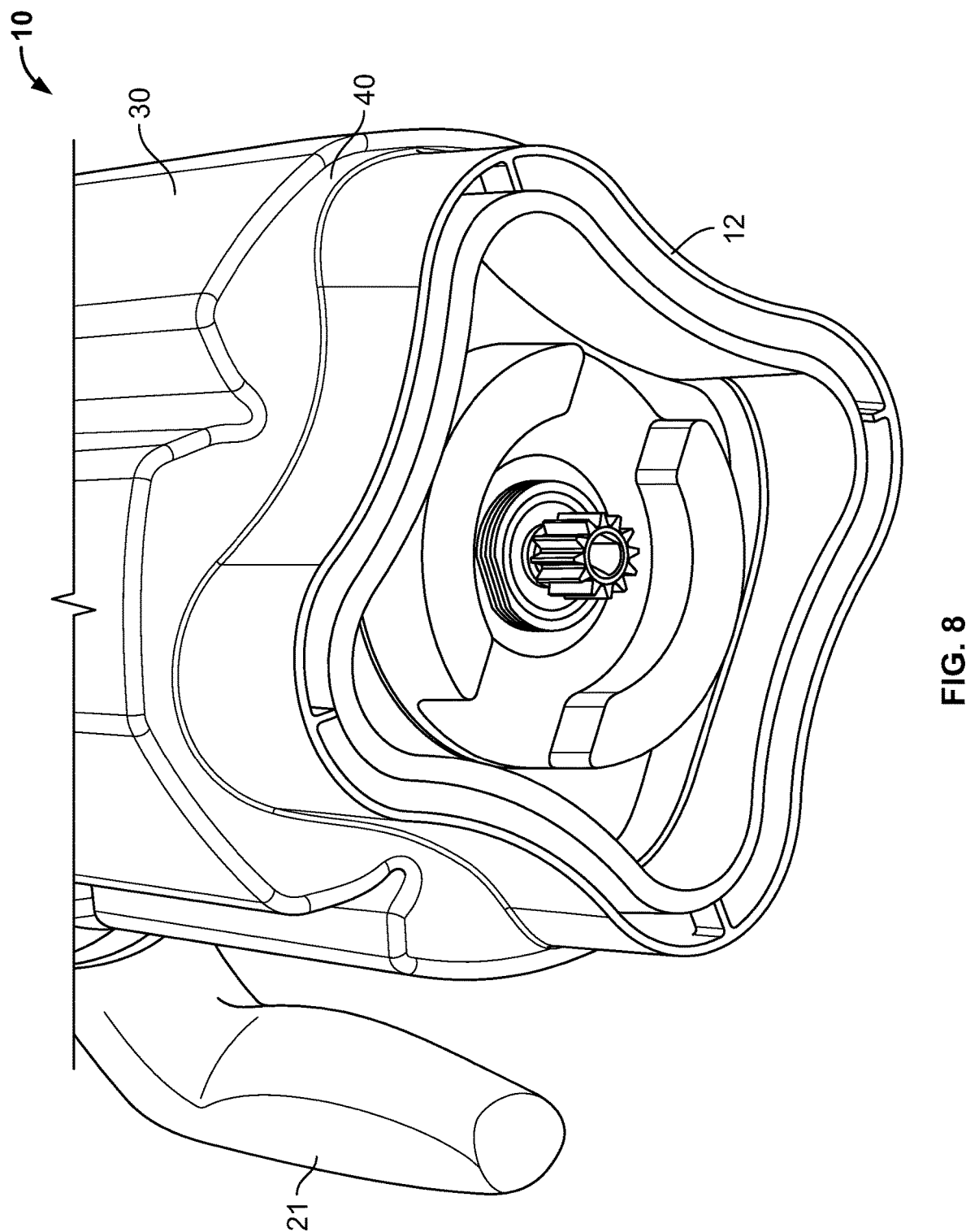
FIG. 8 is a bottom perspective view of a portion of the blending container with sound sleeve.
Figure 9:
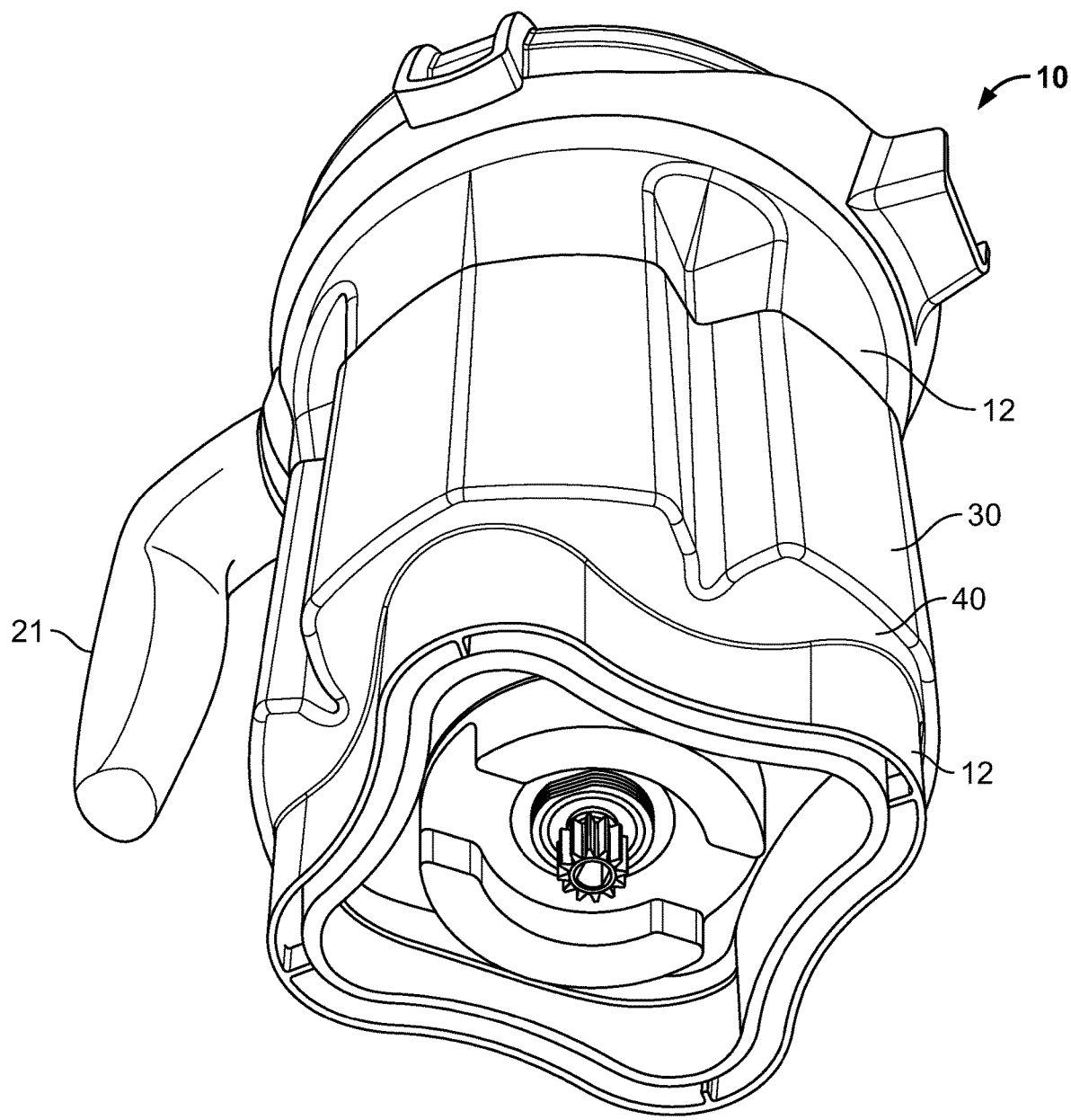
FIG. 9 is a bottom perspective view of the blending container with sound sleeve.
Figure 10:
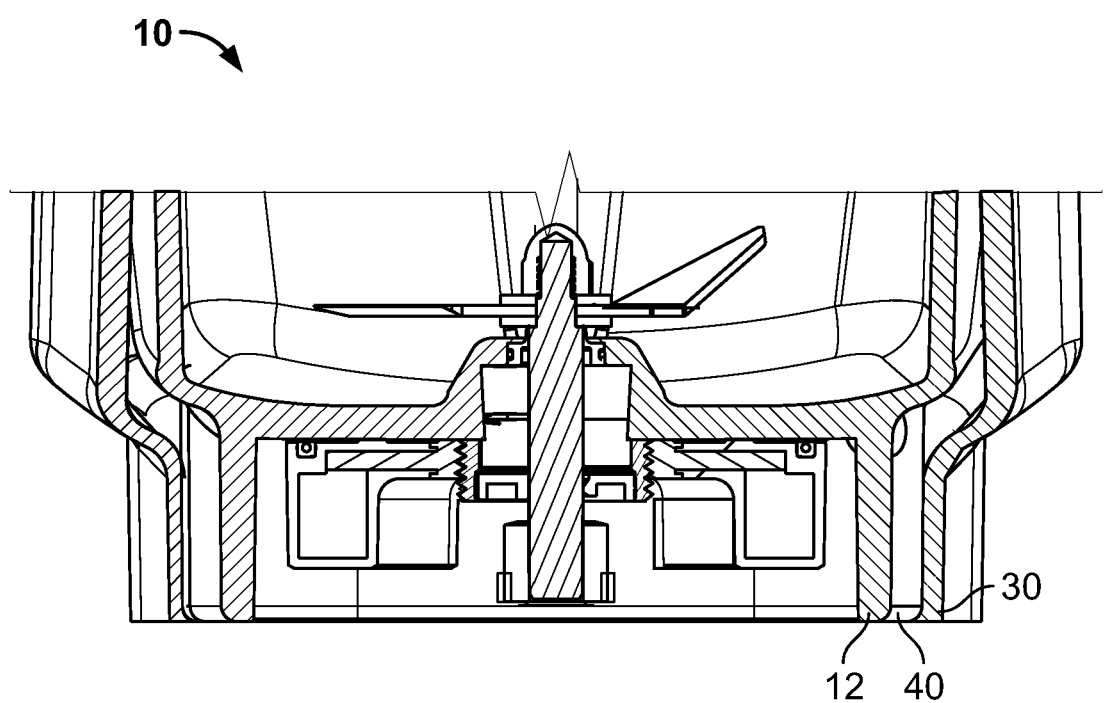
FIG. 10 is a cross-sectional view of a blending container with sound sleeve.

Reference will now be made in detail to exemplary embodiments, examples of which are illustrated in the accompanying drawings. It is to be understood that other embodiments may be utilized and structural and functional changes may be made. Moreover, features of the various embodiments may be combined or altered. As such, the following description is presented by way of illustration only and should not limit in any way the various alternatives and modifications that may be made to the illustrated embodiments.

It is noted that the various embodiments described herein may include other components and/or functionality. It is further noted that while various embodiments refer to a blender or a blender system, various other systems may be utilized in view of embodiments described herein. For example, embodiments may be utilized in food processor systems, mixing systems, hand-held blender systems, various other food preparation systems, and the likes. As such, references to a blender, blender system, and the like, are understood to include food processor systems, and other mixing systems. Such systems generally include a blender base that may include a motor, a controller, a display, a memory and a processor. Further, such systems may include a blending container and a blade assembly. The blade assembly, the blending container, and the blender base may removably or irremovably attach. The blending container may be powered in any appropriate manner, such as disclosed in U.S. patent application Ser. No. 14/213,557, entitled Powered Blending Container, which is hereby incorporated by reference. Foodstuff may be added to the blender container. Furthermore, while blending of "ingredients," "contents" or "foodstuffs" is described by various embodiments, it is noted that non-food stuff may be mixed or blended, such as paints, epoxies, construction material (e.g., mortar, cement, etc.), and the likes. Further, the blender systems may include any household blender and/or any type of commercial blender system, including those with covers that may encapsulate or partially encapsulate the blender. Further, commercial blender systems may include an overall blender system, such as a modular blender system that may include the blender along with other components, such as a cleaner, foodstuff storage device (including a refrigerator), an ice maker and/or dispenser, a foodstuff dispenser (a liquid or powder flavoring dispenser) or any other combination of such.

Moreover, blending of foodstuff or ingredients may result in a blended product. Such blended products may include drinks, frozen drinks, smoothies, shakes, soups, purees, sorbets, butter (nut), dips or the likes. It is noted that various other blended products may result from blending ingredients. Accordingly, terms such as "blended product" or "drink" may be used interchangeably unless context suggests otherwise or warrants a particular distinction among such terms. Moreover, such terms are not intended to limit possible blended products and should be viewed as examples of possible blended products.

In an embodiment, the blender assembly may include a blender container and a blade assembly. The blender container may comprise a pitcher, bowl, cup, or other general shape. It is noted that the blender container may be configured for single serving use, commercial use, multi-serving use, or the like. The blender container may include or be coupled with (e.g., removably or irremovably) a blade assembly. The blade assembly may include one or more blades having one or more wings.

A blender may include a base portion which, via feet, may rest on any suitable operating surface. The base may house a motor and other controls which may be operated at a control panel. A pedestal may be carried by the base portion and be adapted to receive a container 10 in accordance with the present teachings.

Container 10 may include a main container body 12 a bottom surface 16 with a side wall 17 extending upwardly from the bottom surface 16. For example, the side wall 17 may extend from a perimeter of the bottom surface 16. Side wall 17 may be transparent, partially transparent, partially opaque, or opaque. In another aspect, the side wall 17 may generally extend from the bottom surface to an open end of the container 10 which can be closed, as desired, by a cover or lid 18. Container 10 may comprise a handle 21 protruding from and/or comprised by the side wall 17. In another aspect, the container 10 may include a spout 22 that may be formed at the top perimeter of the side wall 17 so that foodstuff may readily be poured out of container 10.

In some embodiments, the container body 12 may be generally transparent. In another aspect, the container body may be opaque and/or at least partially opaque. The container body 12 may be colored (e.g., red, black, blue, white, etc.), painted, printed, and/or it may have a metallic finish.

It is noted that container 10 may include additional and/or other components. While components of container 10 may be described as separate components, it is noted that various components may be monolithically formed or may be attached (e.g., removably or irremovably) through a subsequent operation. For instance, handle 21 may be monolithically formed with side 17, may be attached to (e.g., removably or irremovably) side wall 17, and/or may comprise other smaller components (e.g., an over molded grip, a handle frame, etc.). In an aspect the various components may comprise one or more materials, as described herein. As such, described embodiments may refer to particular configurations, materials, or the like, for sake of explanation and brevity, but embodiments of the present disclosure are not limited to such.

A blade assembly 20 may be coupled with (e.g., removably or irremovably) with the container 10. In an aspect, at least a portion of the blade assembly 20 may be positioned within container 10 above bottom surface 16. Blade assembly 20 can be of a conventional blender blade configuration and, as such, may comprise a plurality of radially extending blades 25 which are carried by, and positioned above bottom surface 16 by, a vertically oriented blade shaft 24. Blade shaft 24 may extend downwardly through a hub 23 formed in container bottom surface 16 and is typically connected, as by a spline, to a motor shaft. The container 10 may be shaped and sized to operatively engage with pedestal of a blender base in an appropriate manner. For instance, placement of container 10 on a pedestal automatically operatively align a spline of the blade assembly 20 to engage with a spline coupler. The spline coupler may be connect to a motor shaft of the motor of the blender such that upon activation of the motor, the rotation of motor shaft is transferred to blade shaft 24, and blades 25 are rotated above bottom surface 16 of container 10.

The container 10 may include a sound barrier, such as a sound sleeve 30. The sound sleeve 30 may be composed of any appropriate material that alters (e.g., reduces, resists, prevents, blocks, reflects, absorbs, etc.) transmission of sound waves therethourgh, including, but not limited to, plastic, fiberglass, glass, foam, or metal. The sound sleeve 30 may absorb sound waves. According to another example, the sound sleeve 30 may be configured to reflect sound waves back into a cavity, such that the sound waves may be absorbed by other materials (e.g., foodstuff being blended). In an aspect, the material may be configured to alter specific parameters of wave lengths. For instance, the material may be configured to absorb wave lengths in a particular frequency range, amplitude range, or the like, such as wave lengths perceptible by humans. It is noted that the sound sleeve 30 may comprise materials selected to alter (e.g., improve) efficiency of sound absorbing and/or sound reduction in general.

The sound sleeve 30 may be of any appropriate configuration. By way of a non-limiting example, the sound sleeve 30 may be generally the same configuration as at least a portion of the container body 12, e.g., it may have generally the same cross sectional shape as the container body 12. The sound sleeve 30 may extend at least a portion of the distance from a bottom 32 of the container body 12 to a top of the container body 12. By way of a non-limiting example, the sound sleeve 30 may generally extend a majority portion of the distance, or less than a majority portion, e.g., between 25%-100% of the distance or more specifically between 25%-75% of the distance. The sound sleeve 30 may cover the same distance on all sides or surfaces of the container body 12 or it may vary in its coverage around the container 10. There may be a gap between the sound sleeve 30 and the container body 12 of any appropriate size. For example, the sound sleeve 30 may be spaced a distance of 0.1 mm-25 mm away from the container body 12. In some embodiments, the sound sleeve 30 may be spaced an equal distance away from the container body 12 throughout the coverage area of the sound sleeve 30. In some embodiments, the sound sleeve 30 may be spaced varying distances away from the container body 12 throughout the coverage area of the sound sleeve 30. In some embodiments, the sound sleeve 30 may directly contact the container body 12 in some or all points along the coverage area of the sound sleeve 30. As utilized herein, the coverage area generally refers to the area of which the sleeve 30 circumscribes or encompasses the container body 12.

In an embodiment, sound sleeve 30 may be removable from the container 10. The sound sleeve 30 may be attached to the container body 12 by any appropriate means, e.g., expandable material, adhesive, a fastener, e.g., a snap, a hook, a button, a Velcro® fastener, a magnet, or any other appropriate means of connection. In some embodiments, the sound sleeve 30 may be permanently attached to the container 10. In at least one embodiment, the sound sleeve 30 made be an integral part of the container 10 and may be formed with the container 10. According to at least one embodiment, the sound sleeve 30 may be added to the container 10 after the container body 12 is manufactured. In another aspect, the sound sleeve 30 and the container body 12 may be mechanically nested. For example, the sound sleeve 30 may be friction fit around at least a portion of the container body 12. In a friction fit embodiment, the container body 12 and sound sleeve 30 may radially apply pressure after the container body 12 and the sound sleeve 30 are pushed together, and friction between the container body 12 and sound sleeve 30 may generally keep the container body 12 and sound sleeve 30 attachably assembled.

In some embodiments, the sound sleeve 30 may be generally transparent, opaque, and/or at least partially opaque. Further still, the sound sleeve 30 may be at least partially clear and at least partially opaque. The sound sleeve 30 may be colored (e.g., red, black, blue, white, etc.), printed, painted, and/or it may have a metallic finish. The sound sleeve 30 may be the same color and/or finish as the container body 12 or it may be different.

In at least one embodiment, the sounds sleeve 30 may be superimposed on the container body 12. For instance, the sound sleeve 30 may be deposited via chemical deposition, coating, painting, three dimensional printing, molding, or the like. In another aspect, the sound sleeve 30 may comprise a sheet of material that may be adhered to and/or friction fit to the container. In an example, a sheet of appropriate material may be adhered to at least a portion of the container body 12. The sheet may be cut to an appropriate size before or after being adhered to the body. Furthermore, while embodiments may refer to a single sound sleeve 30, it is noted that embodiments of the sound sleeve 30 may include one or more layers of material. The layers may comprise the same or different materials. For instance, a first layer may comprise a sheet adhered to at least a portion of the container body 12 and/or to a second layer of the sound sleeve 30. The second layer may be friction fit about at least a portion of the container body 12 and/or the first layer. In an embodiment, a first layer may fit around the container body 12 and a second layer may fit higher around the container body 12, above the first layer, i.e., the layers stack on top of the container like a plurality of rings.

A sound dampening material, such as an elastic, an anelastic, or viscoelastic material 40 may be positioned between the sound sleeve 30 and the container body 12. The viscoelastic material 40 may provide a sound altering (e.g., dampening) effect. Dampening materials work by changing the natural vibration frequency of the vibrating surface and thereby lowering radiated noise and increasing the transmission loss of the material. In some examples, a dampening material may absorb some sound energy and may transform the sound energy into other forms of energy, such as heat energy. Many applications and products are subject to vibration from internal, as well as external sources, such as from the motor of the blender. The viscoelastic material 40 may be selected from any appropriate material including, e.g., a material whose elastic modulus may be about 1 and 3 MPa and whose loss factor may be greater than 0.7. For instance, polymers including amorphous polymers, semi-crystalline polymers, biopolymers, bitumen material, or any other suitable viscoelastic material may be used. In some embodiments, the viscoelastic material may be one or more of these, and specifically tailored to maximize the reduction of radiated noise and increasing the transmission loss of the material. In an example, the viscoelastic material 40 may include a combination of viscoelastic or non-viscoelastic materials. By way of a non-limiting example, the viscoelastic material may include a dampening polymer, such as an acrylic polymer, or it may include Sorbothane®, a viscoelastic urethane polymer that is a vibration dampening material which combines shock absorption, good memory, vibration isolation and vibration dampening characteristics.

Any appropriate amount of the viscoelastic material 40 may be utilized. For example, the viscoelastic material 40 may be 0.1 mm-25 mm wide. In some embodiments, the viscoelastic material 40 may have the same width throughout. In some embodiments, the viscoelastic material 40 may have variable width throughout.

The viscoelastic material 40 may include several layers formed by different materials. For example, the viscoelastic material 40 may include a first layer, located adjacent to the sound sleeve 30, and a second layer, placed adjacent to the outer surface of first layer. The second layer may be placed over any suitable surface of the first layer, including, for example, over a top, bottom or side surface, or combinations of these. In some embodiments, several different materials may be placed over different surfaces of first layer to provide different levels of vibration dampening (e.g., based on the geometry of the sound sleeve 30 or the container body 12. In some embodiments, a material may be interspersed between the layers.

In some embodiments, the viscoelastic material 40 may be generally transparent, opaque, at least partially opaque, or the like. The viscoelastic material 40 may be colored (e.g., red, black, blue, white, etc.), printed, painted, or it may have a metallic finish. The viscoelastic material 40 may be the same or different color and/or finish as the sound sleeve 30 and/or the container body 12.

The viscoelastic material 40 may be removable from the container 10 and/or the sound sleeve 30. The viscoelastic material 40 may be attached to the container body 12 by any appropriate means, i.e., expandable material, adhesive, a fastener, e.g., a snap, a hook, a button, a Velcro® fastener, a magnet, or any other appropriate means of connection. In some embodiments, the viscoelastic material 40 may be permanently attached to at least a portion of the container 10. In some embodiments, the viscoelastic material 40 may be added to at least a portion the container 10 after the container 10 is manufactured.

In at least one embodiment, the viscoelastic material 40 may be directly deposited on at least one of the container body 12 or sound sleeve 30. In one aspect, the viscoelastic material 40 may be painted on at least one of the container body 12 or sound sleeve 30. For instance, a portion of the container body 12 generally corresponding to the coverage area of the sound sleeve 30. It is noted that the portion may be less than, about equal to, or greater than the coverage area. In another aspect, a portion of the sound sleeve 30 may be coated with the viscoelastic material 40. Likewise, the portion of the sound sleeve may generally correspond to the cover area of the sound sleeve, for example, the portion may be less than, equal to or greater than the coverage area.

The described embodiments of the subject disclosure, including what is described in the Abstract, is not intended to be exhaustive or to limit the disclosed embodiments to the precise forms disclosed. It is, of course, not possible to describe every conceivable combination of components or methodologies for purposes of describing the claimed subject matter. Thus, it is noted that many other embodiments of the subject innovation are possible and envisioned. Accordingly, the claimed subject matter is intended to embrace all such embodiments that fall within the scope and spirit of the claimed subject matter. Moreover, use of the term "an embodiment" or "one embodiment" throughout is not intended to mean the same embodiment unless specifically described as such.

The words "example" or "exemplary" are used herein to mean serving as an example, instance, or illustration. Any aspect or design described herein as "exemplary" is not necessarily to be construed as preferred or advantageous over other aspects or designs. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. More over, while a particular feature of the subject innovation may have been disclosed with respect to only one of several implementations, such feature may be combined with one or more other features of the other implementations as may be desired and advantageous for any given or particular application.

Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

Moreover, it is to be appreciated that various devices described herein may include computer devices and/or electrical circuit(s) that may include components and circuitry elements of suitable value in order to implement the embodiments of the subject innovation(s). Furthermore, it can be appreciated that many of the various components can be implemented on one or more integrated circuit (IC) chips. For example, a blender system may include one or more IC chips configured to perform operations and/or control components of a blender system.

What is claimed is:

1. A container for a blender, the container comprising:
   a base surface operatively attachable to the blender;
   a blade assembly operatively attached to the base surface, the blade assembly comprising a splined coupler operatively driven by the blender;
   a side wall extending upwardly from said base surface to a top end and defining a cavity for receiving foodstuff; and
   a sound sleeve extending upwardly from said base surface towards the top end for a distance less than the height of the side wall and circumscribing at least a portion of the side wall, wherein the sound sleeve contacts the side wall proximal the top end and is spaced apart from the side wall proximal said base.

2. The container of claim 1, wherein the sound sleeve comprises a material selected from a group consisting of plastic, fiberglass, glass, foam, metal, and a combination of two or more thereof.

3. The container of claim 2 further comprising a sound altering material positioned between the side wall and the sound sleeve.

4. The container of claim 3, wherein the sound altering material comprises a material selected from a group consisting of polymers, amorphous polymers, semi-crystalline polymers, biopolymers, bitumen material, and a combination of two or more thereof.

5. The container of claim 3, wherein the sound altering material contacts the side wall.

6. The container of claim 3, wherein the sound altering material is approximately 0.1-25 mm wide.

7. The container of claim 3, wherein the sound altering material comprises a plurality of layers.

8. The container of claim 7, wherein the sound altering material comprises a plurality of materials.

9. The container of claim 1, wherein portions of the sound sleeve are spaced a distance of between 0.1-25 mm away from portions of the side wall corresponding to a coverage area of the sound sleeve.

10. The container of claim 1, wherein the sound sleeve operatively attaches to the container via mechanical nesting.

11. The container of claim 1, wherein the sound sleeve circumscribes a majority of a portion of an outside of the container.

12. The container of claim 1, wherein the sound sleeve comprises a generally transparent material.

* * * * *